United States Patent
Nakamura et al.

(10) Patent No.: US 11,723,389 B2
(45) Date of Patent: Aug. 15, 2023

(54) AQUEOUS PIGMENT-MATERIAL SOLUTION, MANUFACTURING METHOD FOR AQUEOUS PIGMENT-MATERIAL SOLUTION, AND BLUE-COLORED BEVERAGE

(71) Applicant: DIC Corporation, Tokyo (JP)

(72) Inventors: Hiromasa Nakamura, Sakura (JP); Hisayoshi Arai, Sakura (JP); Junichi Itoh, Sakura (JP); Mitsuteru Ishiwara, Sakura (JP)

(73) Assignee: DIC Corporation, Tokyo (JP)

( * ) Notice: Subject to any disclaimer, the term of this patent is extended or adjusted under 35 U.S.C. 154(b) by 543 days.

(21) Appl. No.: 16/766,041

(22) PCT Filed: Nov. 6, 2018

(86) PCT No.: PCT/JP2018/041108
§ 371 (c)(1),
(2) Date: May 21, 2020

(87) PCT Pub. No.: WO2019/111615
PCT Pub. Date: Jun. 13, 2019

(65) Prior Publication Data
US 2020/0359663 A1    Nov. 19, 2020

(30) Foreign Application Priority Data

Dec. 8, 2017  (JP) ................................ 2017-236018
Apr. 23, 2018  (JP) ................................ 2018-082215

(51) Int. Cl.
*A23L 5/46*   (2016.01)
*A23L 2/58*   (2006.01)
*C09B 61/00*   (2006.01)
*C09B 67/20*   (2006.01)

(52) U.S. Cl.
CPC .................. *A23L 5/46* (2016.08); *A23L 2/58* (2013.01); *C09B 61/00* (2013.01); *C09B 67/0066* (2013.01); *A23V 2002/00* (2013.01)

(58) Field of Classification Search
None
See application file for complete search history.

(56) References Cited

U.S. PATENT DOCUMENTS

2014/0371433 A1* 12/2014 Kojima ................ C07K 14/195
530/409

FOREIGN PATENT DOCUMENTS

| JP | 11-299450 A | 11/1999 |
| JP | 5476867 B2 * | 4/2014 | ............. A23L 1/275 |

OTHER PUBLICATIONS

Machine translation of JP76867 publication date Jun. 19, 1979, pp. 1-4. (Year: 1979).*
Dispersogen LFH, "Dispersing agent for water-based pigment preparations". Available online as of Dec. 9, 2013 from https://www.clariant.com. pp. 1-4. (Year: 2013).*
C. Couteau et al., "Study of thermodegradation of phycocyanin from Spirulina platensis", Sciences des Aliments, 2004, vol. 24, pp. 399-405. (cited in the ISR).
R. Chaiklahan et al., "Stability of phycocyanin extracted from *Spirulina* sp.: Infuluence of temperature, pH and preservatives". Process Biochemistry, 2012, vol. 47, No. 4, pp. 659-664. (cited in the ISR).
V. K. Kannaujiya et.ai., "Thermokinetic stability of phycocyanin and phycoerythrin in food-grade preservatives," Journal of Applied Phycology, 2016, vol. 28, No. 2, pp. 1063-1070. (cited in the ISR).
S. K. Mishra et.al., "Effect of preservatives for food grade C-PC from Spirulina platensis", Prosess Biochemistry, 2008, vol. 43, No. 4, pp. 339-345. (cited in the ISR).
International Search Report dated Feb. 12, 2019, issued for PCT/JP2018/041108.
M. F. Falkeborg et al: "Stabilising phycocyanin by anionic micelles", Food Chemistry, vol. 239, 2018, pp. 771-780. (cited in the Jul. 15, 2021 Search Report issued for EP18885715.5).
He Hang et al., "Study on the stability of protein pigment from Spirulina platensis," Guangzhou Chemical. N92,1995, pp. 23-29 (cited in the Aug. 10, 2022 Office Action issued for CN201880077425.9).
Wanida Pan-utai et al., "Extraction of C-phycocyanin from Arthrospira (Spirulina) and its thermal stability with citric acid," Journal of Applied Phycology, No. 30, pp. 231-242. (cited in the Aug. 10, 2022 Office Action issued for CN201880077425.9) (No date of NPL).
Supplementary European Search Report dated Jul. 15, 2021, issued for European Patent Application No. 18885715.5.
Office Action dated Aug. 10, 2022, issued for Chinese Patent Application No. 201880077425.9.

* cited by examiner

*Primary Examiner* — Jenna A Watts
(74) *Attorney, Agent, or Firm* — Locke Lord LLP; James E. Armstrong, IV; Nicholas J. DiCeglie, Jr.

(57) ABSTRACT

The present invention provides an aqueous pigment-material solution which has excellent thermal stability and less fading particularly even under an acidic condition, a method for producing the same, and a blue-colored beverage. Provided are an aqueous pigment-material solution including a pigment material containing 20 mmol to 200 mmol of polycarboxylic acid having one or more hydroxy groups, in terms of carboxylic acid equivalent, per 1 g of phycocyanin, in which when both the phycocyanin and the polycarboxylic acid are added such that a color value represented by absorbance at 620 nm is 2.5 to 5, an optical density per 1 cm of an optical path length at 800 nm is 0.05 or lower at a hydrogen ion concentration (pH) of 3 or lower, a method for producing the aqueous pigment-material solution, and a blue-colored beverage.

4 Claims, No Drawings

AQUEOUS PIGMENT-MATERIAL SOLUTION, MANUFACTURING METHOD FOR AQUEOUS PIGMENT-MATERIAL SOLUTION, AND BLUE-COLORED BEVERAGE

TECHNICAL FIELD

The present invention relates to an aqueous pigment-material solution suitable for coloring foods, beverages, pharmaceuticals, cosmetics, or the like, a method for producing the same, and a blue-colored beverage.

BACKGROUND ART

As food pigments, a wide variety of red pigments, yellow pigments, and blue pigments are present. However, in recent years, synthetic colorants are questioned due to problems such as carcinogenicity, and an expectation for natural pigments that are considered to be safer increases. However, natural pigments have merits and demerits in terms of physical property. In particular, currently, there are few red and blue pigments that are vivid in color.

In algal pigments, phycocyanin is a bright blue pigment and phycoerythrin is a vivid red pigment. These algal pigments are protein-binding pigments, and thus have poor thermal stability, especially in a solution and are narrow in usable range. In addition, also in a step of producing a beverage containing a pigment material, there was a problem such as fading and precipitation in a heat sterilization step.

CITATION LIST

Patent Literature

PTL 1: JP-A-11-299450

SUMMARY OF INVENTION

Technical Problem

In order to be able to use a pigment in any of applications, the pigment needs to have high heat resistance in any of liquid properties such as acidic, neutral, and basic (alkaline). In particular, phycocyanin has a disadvantage that when subjected to a heat history such as performing of heat sterilization, an awaited vivid color fades.

The present invention was made in view of the circumstances, and an object of the present invention is to provide an aqueous pigment-material solution which has excellent thermal stability under an acidic condition, a method for producing the same, and a blue-colored beverage.

Solution to Problem

As a result of intensive studies to solve the problems, the present inventors found that an aqueous pigment-material solution including a pigment material containing 20 mmol to 200 mmol of a polycarboxylic acid (B) having one or more hydroxy groups, in terms of carboxylic acid equivalent, per 1 g of phycocyanin (A), in which in a case where both the phycocyanin (A) and the polycarboxylic acid (B) are added such that a color value represented by absorbance at 620 nm is 2.5 to 5, an optical density per 1 cm of an optical path length at 800 nm is 0.05 or lower at a hydrogen ion concentration index (pH) of 3 or lower can solve the problems, and completed the present invention.

That is, the aqueous pigment-material solution, a method for producing the same, and a blue-colored beverage of the present invention are as follows.

1. An aqueous pigment-material solution including: a pigment material containing 20 mmol to 200 mmol of a polycarboxylic acid (B) having one or more hydroxy groups, in terms of carboxylic acid equivalent, per 1 g of phycocyanin (A), in which in a case where both the phycocyanin (A) and the polycarboxylic acid (B) are added such that a color value represented by absorbance at 620 nm is 2.5 to 5, an optical density per 1 cm of an optical path length at 800 nm is 0.05 or lower at a hydrogen ion concentration index (pH) of 3 or lower.

2. The aqueous pigment-material solution according to 1, further including 15 to 100 mmol of an anionic surfactant as a nonvolatile component per 1 g of the phycocyanin (A).

3. A method for producing an aqueous pigment-material solution having a hydrogen ion concentration index (pH) of 3 or lower, the method including a step of dissolving phycocyanin (A) and a polycarboxylic acid (B) having one or more hydroxy groups in water.

4. The method for producing an aqueous pigment-material solution according to 3, in which 20 mmol to 200 mmol of the polycarboxylic acid (B) having one or more hydroxy groups, in terms of carboxylic acid equivalent, is used per 1 g of the phycocyanin (A).

5. The method for producing an aqueous pigment-material solution according to 3 or 4, further including: a step of removing a phycocyanin aggregate without using an anionic surfactant.

The method for producing an aqueous pigment-material solution according to 3 or 4, in which an anionic surfactant is further used.

A blue-colored beverage including the aqueous pigment-material solution according to 1.

A blue-colored beverage including the aqueous pigment-material solution according to 2.

Advantageous Effects of Invention

According to the present invention, there is the outstanding remarkable technical effect that it is possible to provide an aqueous pigment-material solution having excellent thermal stability under an acidic condition, a method for producing the same, and a blue-colored beverage.

DESCRIPTION OF EMBODIMENTS

<Pigment Material>

Hereinafter, the present invention will be described based on preferred embodiments.

An aqueous pigment-material solution of the present invention includes a pigment material containing 20 mmol to 200 mmol of a polycarboxylic acid (B) having one or more hydroxy groups, in terms of carboxylic acid equivalent, per 1 g of phycocyanin (A), in which in a case where both the phycocyanin (A) and the polycarboxylic acid (B) are added such that a color value represented by absorbance at 620 nm is 2.5 to 5, an optical density per 1 cm of an optical path length at 800 nm is 0.05 or lower at a hydrogen ion concentration index (pH) of 3 or lower.

(Phycocyanin)

The phycocyanin (A) is a kind of phycobiliprotein, and is a blue pigment which contains phycocyanobilin and a protein and is a solid at a room temperature. The phycocyanin (A) may be C-phycocyanin, allophycocyanin, or R-phycocyanin. The phycocyanin (A) can be obtained, for example, by being extracted from algae by predetermined means.

For the phycocyanin (A), any known and commonly used one can be used, and examples thereof include an algal pigment derived from various algae such as cyanobacteria and red algae. Phycocyanin (A) may be a natural product, but is preferably a *Spirulina* pigment, which contains phycobiliprotein as a main component, of cyanobacteria belonging to the genus *Arthrospira* or *Spirulina* (hereinafter, sometimes referred to as "*Spirulina*") in that the *Spirulina* pigment can be artificially cultured by various culture methods and is easily available. The phycocyanin (A) itself is mainly blue, and thus, is used as a blue pigment material.

An acquisition method for phycocyanin from "*Spirulina*" is not particularly limited. For example, the phycocyanin can be extracted by a method of extracting from *Spirulina* with a buffer solution, and can be acquired by a method described in Literature (JP-A-52-134058) as an example.

(Polycarboxylic Acid Containing One or More Hydroxy Groups)

The polycarboxylic acid (B) containing one or more hydroxy groups is a carboxylic acid containing one or more hydroxy groups and two or more carboxy groups [hereinafter, abbreviated as carboxylic acid (B)]. In the present invention, the definition of the carboxylic acid (B) does not include a salt of the carboxylic acid. The carboxylic acid (B) is a compound containing a free carboxyl group that is not a salt.

The carboxylic acid (B) may be either a solid at a room temperature or a liquid. In addition, since the carboxylic acid (B) is used in combination with the phycocyanin (A), it is preferable that the carboxylic acid (B) itself has the same color, taste, and odor as those of the phycocyanin (A), or is colorless, tasteless, and odorless. In a case where the (A) and (B) of the present invention are used under an acidic condition, the carboxylic acid (B) may have a sour taste.

Examples of such carboxylic acid (B) can include citric acid, malic acid, and tartaric acid. Among these, it is preferable to use a citric acid (B) as the carboxylic acid, in that structural stability of the phycocyanin (A) under the acidic condition increases when the phycocyanin (A) is combined with the polycarboxylic acid (B) containing one or more hydroxy groups.

As shown in Examples to be described later, the present inventors found that the carboxylic acid (B) has an action of improving the thermal stability of the phycocyanin (A), particularly, the thermal stability thereof under an acidic condition. The action is unique to the polycarboxylic acid (B) containing one or more hydroxy groups, and is not exhibited by a salt of polycarboxylic acid containing one or more hydroxy groups, corresponding to the carboxylic acid.

As water (C), any known and commonly used water can be used. For example, distilled water, ion-exchanged water, and purified water can be used. In the present invention, since the carboxylic acid (B) is used, it is preferable to use water having a pH of 7 that does not contain an ionic component or contains as little as possible.

(Regarding Component Ratio)

The aqueous pigment-material solution of the present invention includes the phycocyanin (A), the polycarboxylic acid (B) having one or more hydroxy groups, and the water (C), as essential components, and is prepared to contain 20 mmol to 200 mmol of the polycarboxylic acid (B) having one or more hydroxy groups, in terms of carboxylic acid equivalent, per 1 g of the phycocyanin (A). In particular, when 50 mmol to 100 mmol of the citric acid in terms of carboxylic acid equivalent is contained per 1 g of the phycocyanin (A), a pigment material having the least fading under the acidic condition and having particularly excellent thermal stability can be obtained. A content proportion of the water (C) in the aqueous pigment-material solution is not particularly limited. The water (C) can be used such that the content proportion is 4000 to 25000 parts per 100 parts in total of the phycocyanin (A) and the polycarboxylic acid (B) containing one or more hydroxy groups, in terms of mass. In a step of dissolving the phycocyanin (A) and the polycarboxylic acid (B) containing one or more hydroxy groups in water, when the phycocyanin (A) and the carboxylic acid (B) are dissolved in water such that both of them satisfy the component ratio, a pH of the aqueous solution thereof becomes 3 or lower.

Although it also depends on a combination ratio of the carboxylic acid (B) dissolved in water (C), the larger the total amount of the phycocyanin (A) and the carboxylic acid (B), the darker the blue color and the thicker the aqueous pigment-material solution. If necessary, the aqueous pigment-material solution may be diluted or the like, so that in coloring at the same color value, coloring can be performed on more objects to be colored, which is preferable. Of course, instead of preparing the thick aqueous pigment-material solution once and then diluting the solution, a dilute aqueous pigment-material solution may also be obtained directly such that the concentration becomes suitable for use applications or the purpose, without going through the thick aqueous pigment-material solution.

(Absorbance)

In addition to the above, the aqueous pigment-material solution of the present invention also has a feature that in a case where both the phycocyanin (A) and the polycarboxylic acid (B) are added such that a color value represented by absorbance at 620 nm is 2.5 to 5, an optical density per 1 cm of an optical path length at 800 nm is 0.05 or lower at a hydrogen ion concentration index (pH) of 3 or lower.

Adding both the phycocyanin (A) and the polycarboxylic acid (B) such that the color value represented by the absorbance at 620 nm becomes 2.5 to 5 refers to adding both the phycocyanin (A) and the polycarboxylic acid (B) such that the color value is obtained at a predetermined one point selected in the color values of 2.5 to 5. Similarly, the optical density at a hydrogen ion concentration index (pH) of 3 or lower refers to an optical density at a predetermined one point selected in the hydrogen ion concentration indices (pH) of 3 or lower. When an aqueous pigment-material solution known in the related art is compared with the aqueous pigment-material solution of the present invention in the optical density, under the condition where the color value and the pH are fixed in the ranges, the excellent thermal stability of coloring of the aqueous pigment-material solution of the present invention, under the acidic condition can be found.

The color value at the one point or the pH at the one point selected may be the same as or different from each other in the range, depending on a kind of the carboxylic acid (B) used in the preparation of the aqueous pigment-material solution. Therefore, it is preferable to determine the optimum color value or pH according to the kind of the carboxylic acid (B) to be used and to measure the optical density using absorbance. A detailed method for measuring absorbance will be described later.

In the present invention, it is defined as "in a case where both the phycocyanin (A) and the polycarboxylic acid (B) are added such that a color value represented by absorbance at 620 nm is 2.5 to 5". However, the color value of 2.5 to 5 is merely a measurement condition for determining the optical density per 1 cm of the optical path length at 800 nm using the aqueous pigment-material solution having a hydrogen ion concentration index (pH) of 3 or lower. Not only the thick aqueous pigment-material solution but also the dilute aqueous pigment-material solution may be used, and it does not mean that the aqueous pigment-material solution having a color value outside the range of 2.5 to 5 is uniformly excluded from the technical scope of the present invention. That is, in the present invention, it is assumed that the optical density is measured in the color value range of 2.5 to 5, and in an aqueous pigment-material solution having a color value of less than 2.5, concentration or the like is performed and the optical density is measured at a predetermined point in the color value range of 2.5 to 5, on the other hand, in an aqueous pigment-material solution having a color value exceeding 5, the optical density is measured at a predetermined point in the color value range of 2.5 to 5 by performing diluting or the like. When the obtained optical densities are 0.05 or less, it can be determined that the aqueous pigment-material solution belongs to the technical scope of the present invention.

In the present invention, 15 to 100 mmol of an anionic surfactant as a nonvolatile component is contained per 1 g of the phycocyanin (A). Accordingly, dispersion stability of the phycocyanin (A) in an aqueous solution can be improved and a change in color value itself (color value residual ratio) or a change in color tone (color difference) before and after being subjected to a heat history can be suppressed to be small, which are preferable. The anionic surfactant exhibits the remarkable effects within the combination range.

Examples of such anionic surfactants include sodium dodecyl sulfate (SDS), sodium dodecylbenzenesulfonate, sodium 2-sulfotetradecanoic acid 1-methyl ester, and sodium dodecylphosphate.

In a case of coloring an object to be colored with the aqueous pigment-material solution, when the aqueous pigment-material solution contains some insoluble components, the aqueous pigment-material solution itself looks cloudy, giving a sensuously bad impression. Although it is possible to color the object to be colored once, partial coloring unevenness may be caused. Alternatively, in a case where the object to be colored is a beverage or the like, there is a substantial inconvenience such as a bad texture when ingested. The existence degree of a water-insoluble component represented by a phycocyanin aggregate can be evaluated by measuring the optical density at an incident light wavelength of 800 nm. The smaller the optical density measured value (OD), the smaller the content proportion of water-insoluble component, and the aqueous pigment-material solution having smaller defects or having no defect is obtained.

In a case where an aqueous pigment-material solution containing the phycocyanin (A) and a "salt" of the polycarboxylic acid containing one or more hydroxy groups is prepared, the hydrogen ion concentration index (pH) of the aqueous solution itself is in neutral to basic. In a case where such aqueous pigment-material solution is acidified under the assumption of using under the acidic condition, a large amount of the phycocyanin aggregates, which are water-insoluble components, are generated, and the aqueous solution becomes quite cloudy. This is a finding that cannot be understood by evaluating the heat resistance simply by mixing the phycocyanin (A) and the carboxylic acid (B) in solids. From this, it is clear that the aqueous pigment-material solution containing the phycocyanin (A) and the "salt" of the polycarboxylic acid having one or more hydroxy groups is not suitable for use under the acidic condition.

(Method for Producing Aqueous Pigment-Material Solution)

The aqueous pigment-material solution of the invention can be prepared by mixing the phycocyanin (A), the polycarboxylic acid (B) having one or more hydroxy groups, and the water (C) at the predetermined component ratio, in terms of mass to dissolve the phycocyanin (A) and the carboxylic acid (B) in the water (C).

In the producing method for the aqueous pigment-material solution of the present invention, the phycocyanin (A) itself may be used as a raw material. However, if necessary, a known and commonly used phycobiliprotein containing the phycocyanin (A) may be used instead of the phycocyanin (A).

In a case where the phycocyanin (A) and the carboxylic acid (B) are dissolved in the water (C), examples of the method include a method of preparing a water (C) solution of the phycocyanin (A) and further dissolving the carboxylic acid (B) therein, a method of preparing a water (C) solution of the carboxylic acid (B) and further dissolving the phycocyanin (A) therein, and a method of dissolving the phycocyanin (A) and the carboxylic acid (B) in the water (C) at the same time in parallel.

For a method for contacting the phycocyanin (A) with the carboxylic acid (B) in the water (C), a known mixing method can be adopted. For example, any of various dynamic and static mixing methods such as rotary stirring using a stirring blade, such as a juicer, mixer, mill, or micro mixer, collision of liquids with each other, and repetition of coalescence-division of liquids can be applied.

Regarding the mixing of the phycocyanin (A) and the carboxylic acid (B), both may be mixed at once or may be mixed little by little, and each aqueous solution thereof is prepared and the aqueous solution may be mixed with the water (C).

In the preparation of the aqueous solution, a temperature of each of the phycocyanin (A), the carboxylic acid (B), and the water (C) is not particularly limited, and may be appropriately set according to kinds of the phycocyanin (A) and the carboxylic acid (B). For example, both are 0° C. or higher and 50° C. or lower. It is preferable that a temperature difference between the three components is as small as possible, in that problems such as aggregation are unlikely to occur during mixing.

In the producing method for the aqueous pigment-material solution of the present invention, the step of dissolving the phycocyanin (A) and the polycarboxylic acid (B) having one or more hydroxy groups in water is carried out as an essential step to produce the aqueous pigment-material solution having the hydrogen ion concentration index (pH) of 3 or lower. The aqueous pigment-material solutions having various concentrations obtained through the step of dissolving in water can be immediately used for coloring the object to be colored. However, when including an aging step, for example, aging for 5 to 48 hours at a temperature of 15° C. to 30° C., the thermal stability can be improved more than in a case without aging, and above all, a decrease in the color value before and after the heating can be suppressed. In addition, an aqueous pigment-material solution having more excellent dispersion stability of the phycocyanin (A) in water can be produced.

In the producing method for the aqueous pigment-material solution, in the step of dissolving the phycocyanin (A) and the carboxylic acid (B) in the water (C), in a case where a small amount of water-insoluble component containing phycocyanin aggregates is generated, it is more preferable that a step of removing the water-insoluble component is carried out subsequent to the dissolving step. A thick aqueous pigment-material solution is prepared once and then may be diluted to prepare a dilute aqueous pigment-material solution with a desired concentration. However, when the dilute aqueous pigment-material solution with a desired concentration is prepared without going through the step of preparing the thick aqueous pigment-material solution, problems such as aggregation are unlikely to occur, and even if the aggregation occurs, the degree is minor, and the step of removing the water-insoluble component can be omitted, or the load of the removal step can be reduced more simply and the productivity can be improved, which are preferable.

In the step of removing the water-insoluble component, for example, means for decantation, filtration, and centrifugation can be adopted. In the producing method for the aqueous pigment-material solution of the present invention, if necessary, the aqueous pigment-material solution may be concentrated by further including a concentration step as an essential process, under the condition in which the water-insoluble component is unlikely generated.

In the present invention, when the carboxylic acid (B) is dissolved in the water (C) together with the phycocyanin (A), the solubility of the phycocyanin (A) in the aqueous solution is improved by some interaction. Although details are unknown, it is presumed that, the carboxyl group of the carboxylic acid (B) are selectively oriented on the surface side of the phycocyanin (A), and the hydroxy groups (hydroxyl group) are selectively oriented on the water (C) side, and thus the solubility of the phycocyanin (A) in the water (C) is further improved based on the hydroxy groups. On the other hand, very surprisingly, the present inventors found that even the aqueous pigment-material solution from which the water-insoluble component was removed itself has excellent thermal stability.

Due to the action of the carboxylic acid (B), in the aqueous pigment-material solution of the present invention, the generation of the water-insoluble component is effectively suppressed, and it is possible to maintain a state in which the phycocyanin (A) is stably and uniformly dissolved in the solution, even going through a heat history.

In the producing method for the aqueous pigment-material solution of the present invention, the phycocyanin (A) and the carboxylic acid (B) are contained in water and, if necessary, by removing the water-insoluble component which may occur at the initial stage of mixing thereof, it is possible to easily obtain an aqueous pigment-material solution which is less faded under the acidic condition and has excellent thermal stability.

According to the findings of the present inventors, in the dissolving step of dissolving the phycocyanin (A) and the carboxylic acid (B) in water, in a case where the aqueous pigment-material solution is produced only using the components, it is preferable to further include the step of removing a water-insoluble component such as the phycocyanin aggregate. However, in a case where an anionic surfactant is further used in combination therewith as a dissolving step of dissolving the phycocyanin (A) and the carboxylic acid (B) in water, substantially no water-insoluble component such as the phycocyanin aggregate is generated, and there is no need to include the step of removing the water-insoluble component such as phycocyanin aggregates. Therefore, a productivity of the aqueous pigment-material solution can be further increased. In a case where an aqueous pigment-material solution containing the water-insoluble component from any reason is obtained, it is preferable to add the anionic surfactant thereto after the step of removing the water-insoluble component, in that the problems due to the presence of the water-insoluble component can be eliminated.

In addition, in a case of directly preparing the dilute aqueous pigment-material solution, the generation of the water-insoluble component is suppressed, and the phycocyanin (A) has excellent thermal stability by the action of the anionic surfactant even without going through the step of removing the water-insoluble component and without going through the aging step and it is possible to produce the aqueous pigment-material solution having more excellent dispersion stability of the phycocyanin (A) in water with high productivity.

(Other Components)

In addition to the phycocyanin (A) and the carboxylic acid (B), other components which do not correspond thereto may be contained in the aqueous pigment-material solution as a nonvolatile component. Examples of other components which are nonvolatile components include salts of polycarboxylic acids having one or more hydroxy groups, excipients, preservative, various vitamins, various minerals, various sugars, substances other than protein-based pigments derived from the algae, and substances derived from the medium components of the algae.

In addition, the aqueous pigment-material solution of the present invention may further contain an organic solvent miscible with water, in addition to the nonvolatile component. As the organic solvent, for example, ethanol or isopropanol can be used.

Examples of the salt of the polycarboxylic acid having one or more hydroxy groups include metal salts or amine salts of the carboxylic acid (B) exemplified above (hereinafter, referred to as a conjugate base). Examples of the metal salts include a sodium salt, a potassium salt, a calcium salt, and an aluminum salt. If at least a part of the carboxyl groups contained in the polycarboxylic acid having one or more hydroxy groups has the salt structure, it is preferable to use a salt that corresponds to the above salts, but in which all of the carboxyl groups have the salt structure, in that handling and procurement of raw materials are easy.

The technical effect of the present invention is based on the unique and specific function of the carboxylic acid (B). However, a carboxylic acid salt (D) corresponding to the conjugate base of the carboxylic acid (B) may further be contained in a small amount, within the range not impairing the technical effect. The number of moles of the carboxylic acid salt (D) used is in a range smaller than that of the carboxylic acid (B). Specifically, on the basis of the number of moles used, it is preferable that Carboxylic acid salt (D)/Carboxylic acid (B) is 1/99 to 20/80 in that the thermal stability under the acidic condition is excellent. In a case where the citric acid is used as the carboxylic acid (B) and a salt (C) thereof is used, specifically, on the basis of the number of moles used, it is preferable that Citric acid salt (D)/Citric acid (B) is 10/90 to 20/80 in that the thermal stability under the acidic condition is excellent.

For example, in the related art, a pigment material containing at least one compound selected from the group consisting of sugar, sugar alcohol, and polyhydric alcohol has been known. The pigment material of the related art may contain a large amount of these compounds in some cases. On the other hand, the pigment material according to an embodiment of the present invention can have good thermal stability of the phycocyanin (A) without using these compounds and only with the carboxylic acid (B). The sugar such as trehalose may be contained in the aqueous pigment-material solution of the present invention, but it cannot be expected by the sugar to contribute to improvement of the thermal stability under the acidic conditions.

A proportion (% by mass) of the phycocyanin (A) in 100% by mass of a nonvolatile component in the pigment material is determined by a known analysis method or a measurement method. A proportion (% by mass) of the carboxylic acid (B) in 100% by mass of the solid content of the pigment material is determined by a known analysis method or a measurement method. For example, the mass of the phycocyanin (A) can be measured based on the absorbance of the aqueous pigment-material solution prepared by dissolving the phycocyanin (A) in a solvent such as water.

In generally known phycocyanin (A), the relationship between the maximum absorption wavelength of the phycocyanin (A) and the concentration % (w/v) of the phycocyanin (A) in the solution is known, and it is possible to determine the proportion (% by mass) of the phycocyanin (A) based on the absorbance at the maximum absorption wavelength of the pigment-material solution. For example, in accordance with a method shown in Document (Yoshikawa, N. and Belay, A. (2008) "Single-laboratory validation of a method for the determination of c-phycocyanin and allophycocyanin in Spirulina (Arthrospira) supplements and raw materials by spectrophotometry", Journal of AOAC International VOL. 91, 524-529), a C-phycocyanin (cPC) concentration (g/L) and an allophycocyanin (aPC) concentration (g/L) in a sample can be determined from the absorbance values at the maximum absorption wavelength. In this case, the maximum absorption wavelength of the cPC in the pigment-material solution is 620 nm, and the maximum absorption wavelength of the aPC in the pigment material solution is 650 nm. The phycocyanin of Spirulina can be determined as the sum of cPC and aPC.

For example, the concentration of the cPC in the sample is determined by the following Equation.

$$cPC\ (mg/mL) = 0.162 \times Abs_{620} - 0.098 \times Abs_{650}$$

For example, the concentration of the aPC in the sample is determined by the following Equation.

$$aPC\ (mg/mL) = 0.180 \times Abs_{650} - 0.042 \times Abs_{620}$$

The measurement wavelength may be appropriately determined according to the maximum absorption wavelength of the sample solution. For example, in a case where the phycocyanin (A) below is contained as the main component in the pigment contained in the sample solution, the measurement wavelength is 610 to 630 nm. The optimum one point may be determined from the range and the measurement may be performed.

<Applications>

The pigment material of the embodiment is suitable for addition to confectionery and breads such as ice cream, soft serve ice cream, cakes, bavarois, yokan, jelly, gum, gummy, and chocolate; noodles such as soba, udon, somen noodles; various kinds of foods such as tofu, kamaboko, and fish cake balls; beverages such as matcha tea drinks, green tea drinks, milk drinks, soy milk drinks, vegetable drinks, fruit drinks, and soft drinks; and pharmaceuticals such as tablets, and cosmetics.

According to the aqueous pigment-material solution of the present invention, for example, the thick aqueous pigment-material solution is diluted with a solvent as necessary such that a desired target color value is obtained, or a dilute aqueous pigment-material solution is concentrated as necessary such that a desired target color value is obtained, and the solution is further mixed with a beverage. Accordingly, it is possible to easily prepare a beverage colored in blue having the intended color value (blue-colored beverage). Among them, in the soft drinks and fruit drinks (juice) that are acidic itself as a beverage, the aqueous pigment-material solution of the present invention exhibits remarkable effects that heat resistance is excellent and there is no or small fading even after going through a heat history such as heat sterilization. Since the soft drinks or fruit drinks are often acidic buffer solutions (sometimes called buffers), for the convenience, the degree of fading under the acidic condition can be found in a manner that the acidic buffer solution is used as a simulated beverage which is an object to be colored, and the aqueous pigment-material solution of the present invention is diluted with the buffer solution to observe changes in color value before and after heating.

In addition, the aqueous pigment-material solution of the present invention is suitable for coloring by itself, but may be provided in a composite form with other pigment materials. Examples of other pigment materials include green powder of young barley leaves, kale, mulberry, bamboo grass, moloheiya, Chlorella, green shiso, broccoli, spinach, green pepper, and tomorrow leaves, in addition to safflower yellow, Gardenia yellow, matcha and green tea.

EXAMPLES

Hereinafter, the present invention will be described based on Examples.

<Measurement of Absorbance of Solution>

The absorbance of the solution was measured using a quartz cell having an optical path length of 1 cm by a UV/Vis spectrophotometer (U-3900H manufactured by Hitachi High-Tech Science Co., Ltd.). The number following Abs indicating the absorbance indicates the measurement wavelength (nm).

<Heat Resistance and Acid Resistance Evaluation for Phycocyanin-Containing Blue Aqueous Pigment-Material Solution>

A color value residual ratio Abs % before and after heating with $Abs_{620}$ is calculated by the following Equation. The value of the Abs % can be used to evaluate heat resistance and acid resistance.

$$Abs\ \% = (Abs_{620}\ after)/(Abs_{620}\ before) \times 100$$

Here, the absorbance before heating and the absorbance after heating are referred to as "Abs before" and "Abs after", respectively.

Example 1

25 mg of Lina Blue G1 (vegetable blue pigment manufactured by DIC Life Tech Co., Ltd., 1 point within the range of 26% to 30% by mass in terms of phycocyanin, containing 5% by mass of trisodium citrate, 55% by mass of trehalose, 8% by mass of other proteins, and 4% by mass of other components) was dispersed in 5 mL of an aqueous solution containing citric acid and citrate in a predetermined molar ratio, and the mixture was allowed to stand at room temperature (25° C.) for 16 hours to be dissolved. By centrifuging the solution under conditions of 25° C.×9253 G×10 minutes, a precipitate including water-insoluble content containing phycocyanin aggregates was removed, and the supernatant was collected to obtain a phycocyanin-containing blue pigment material (thick aqueous pigment-material solution).

The resulting thick aqueous pigment-material solution was a pigment material composition having a compounding ratio of 90 mmol of carboxylic acid derived from the citric acid (and 4 mmol of a conjugate base of the citric acid, pH 2.2) per 1 g of phycocyanin. A color value of the thick aqueous pigment-material solution was 2.9, and an optical density per 1 cm of the optical path length at 800 nm was 0.006.

In addition, assuming that a soft drink which is an object to be colored is colored, the thick aqueous pigment-material solution was diluted with 50 mM citrate buffer such that $Abs_{620}$ becomes about 0.7 at the same pH 2.2 as above. Then, 1 ml of the diluted solution was dispensed into a 1.5 ml plastic tube to obtain a dilute aqueous pigment-material solution (simulated blue-colored beverage) before heating. The sample was heat-treated at 70° C. for 30 minutes by a tabletop incubator (WSL-2610 manufactured by Atto Co., Ltd.), centrifuged at conditions of 25° C.×9253 G×5 minutes to obtain the dilute aqueous pigment-material solution (simulated blue-colored beverage) after heating.

Regarding the dilute aqueous pigment-material solution (simulated blue-colored beverage) before and after the heat treatment, the absorbance was measured under the following conditions, and then the color value residual ratio which is an index of the thermal stability of the pigment under the acidic condition was determined therefrom.

The color value residual ratio determined as above was 82.2%.

Example 2

A thick aqueous pigment-material solution was obtained in the same manner as in Example 1, except that the carboxylic acid derived from the citric acid was 20 mmol (and the conjugate base of the citric acid was 2 mmol, and pH 2.5). A color value of the thick aqueous solution was 4.3, and an optical density per 1 cm of the optical path length at 800 nm was 0.005. Furthermore, a dilute aqueous pigment-material solution was prepared and heat-treated in the same manner as in Example 1, except that 12.5 mM citrate buffer was used for dilution. The color value residual ratio was measured. The color value residual ratio was 67.5%.

Example 3

A thick aqueous pigment-material solution was obtained in the same manner as in Example 1, except that the carboxylic acid derived from the citric acid was 200 mmol (and the conjugate base of the citric acid was 17 mmol, and pH 2.5). A color value of the thick aqueous solution was 2.7, and an optical density per 1 cm of the optical path length at 800 nm was 0.005. Furthermore, a dilute aqueous pigment-material solution was prepared and heat-treated in the same manner as in Example 1, except that 125 mM citrate buffer was used for dilution. The color value residual ratio was measured. The color value residual ratio was 73.5%.

Example 4

A thick aqueous pigment-material solution was obtained except that the carboxylic acid derived from L-malic acid was 22 mmol (and the conjugate base of L-malic acid was 1 mmol and pH 2.5). A color value of the thick aqueous solution was 3.0, and an optical density per 1 cm of the optical path length at 800 nm was 0.007. Furthermore, a dilute aqueous pigment-material solution was prepared and heat-treated in the same manner as in Example 1, except that 18.75 mM L-malic acid aqueous solution was used for dilution. The color value residual ratio was measured. The color value residual ratio was 59.2%.

Example 5

A thick aqueous pigment-material solution was obtained except that the carboxylic acid derived from L-tartaric acid was 21 mmol (and the conjugate base of L-tartaric acid was 2 mmol and pH 2.5). A color value of the thick aqueous solution was 3.4, and an optical density per 1 cm of the optical path length at 800 nm was 0.004. Furthermore, a dilute aqueous pigment-material solution was prepared and heat-treated in the same manner as in Example 1, except that 18.75 mM L-tartaric acid aqueous solution was used for dilution. The color value residual ratio was measured. The color value residual ratio was 63.9%.

Comparative Example 1

Lina Blue G1 and a citric acid trisodium salt were dispersed in an aqueous solution in a predetermined molar ratio, and allowed to stand for 16 hours at room temperature (25° C.) to be dissolved to obtain a phycocyanin-containing blue pigment material (thick aqueous pigment-material solution) (since precipitation did not occur, no centrifugation was performed). The resulting thick aqueous pigment-material solution had a color value of 37 and was a pigment material composition having a compounding ratio of 9 mmol of conjugate base of the citric acid (citric acid trisodium salt) (pH 8.9 and containing no citric acid itself) per 1 g of phycocyanin.

When a 50 mM citric acid aqueous solution was added to the thick aqueous pigment-material solution so as to have a pH of 2.5, remarkable turbidity and precipitation occurred. An optical density of the suspension per 1 cm of the optical path length at 800 nm was 0.073 (0.05 or more).

Furthermore, the suspension was centrifuged in the same manner as in Example 1 to remove the precipitate, and the resulting aqueous solution had a color value of 0.82. The color value was significantly smaller than the color values in Examples, and was extremely pale (light) blue as compared with the shade of blue of the aqueous pigment-material solution of Examples.

In addition, assuming use for the soft drink which is an object to be colored, a dilute aqueous pigment-material solution (simulated blue-colored beverage) was prepared in the same manner as in Example 1 and a heat resistance test was performed at a pH of 2.5. The color value residual ratio was determined. The color value residual ratio was 27.3%, which was significantly lower than that in Example 1.

Example 1 shows an aqueous pigment-material solution in which the citric acid is dominant. Comparative Example 1 shows an aqueous pigment-material solution in which citric acid conjugate base is dominant.

As can be seen from the comparison between Example 1 and Comparative Example 1, the aqueous pigment-material solution of Example 1 having a small optical density at 800 nm of incident light due to light scattering has a less turbidity and is sensuously good, and when colored it is considered that a partial coloring unevenness becomes small, and the color value itself is large. A blue-colored beverage prepared using the same exhibits a vivid blue color and does not have an unpleasant texture when ingested. On the other hand, the aqueous pigment-material solution of Comparative Example 1 having a large optical density at 800 nm is very turbid and have a sensuously bad impression, and it is considered that a partial coloring unevenness due to a water-insoluble component containing phycocyanin aggregates is generated and the color value itself is small. A blue-colored beverage prepared using the same exhibits a relatively pale (light) blue color, and is considered to have a bad texture when ingested.

Moreover, regarding the thermal stability (heat resistance) of the aqueous pigment-material solution under the acidic condition before and after heating, as can be seen from a rate of change in the color value before and after heating, it is apparent that the aqueous pigment-material solution of Example 1 in which the citric acid is dominant is remarkably excellent compared with the aqueous pigment-material solution of Comparative Example 1 in which the citric acid conjugate base is dominant.

Furthermore, compared to a case of using the citric acid conjugate base to be dominant, in a case of using the citric acid to be dominant, it is easier to prepare an aqueous pigment-material solution having a larger color value, and it is also possible to reduce the using amount of the aqueous pigment-material solution to be used for coloring with the same color value.

It is apparent that the aqueous pigment-material solution of the present invention has less fading even applying a heat history such as heat sterilization under the acidic condition, and has excellent thermal stability under the acidic condition.

Example 6

An aqueous solution containing 0.6% Lina Blue G1 and 1.25% of sodium dodecyl sulfate (SDS) was prepared. A citrate buffer solution (pH 2.5, 62.5 mM) was added thereto in a 4-fold volume. As a result, the final concentration of the SDS was 0.25%, the mass ratio of phycocyanin to the SDS was 0.144, and the final concentration of the citric acid was 50 mM.

The dilute aqueous solution obtained above was not allowed to stand at room temperature (25° C.) for 16 hours, and was centrifuged under conditions 25° C.×9253 G×10 minutes, and the supernatant was collected to obtain a phycocyanin-containing blue pigment material. Since the dilute aqueous solution obtained above did not contain any water-insoluble component, there is no need to perform the centrifugation originally, but a step of centrifugation was performed in order to match the conditions with those of Example 7 below in which a slight water-insoluble components were generated. The pigment material was heat-treated at 70° C. for 30 minutes with the tabletop incubator and centrifuged (25° C.×9253 G×5 minutes) just in case. When the absorbance before and after heating were measured, the color value residual ratio of this sample was 94.1%.

In addition, an L*a*b* value was calculated as follows. Based on the absorbance at 360 to 780 nm, it was converted into the XYZ color coordinate system by the CIE D65 standard light source and the CIE2° color matching function, and further converted into the L*a*b* color coordinate system.

The change in absorbance before and after heating was evaluated by the following Equation, which is the distance in the color space. A color difference ΔE before and after heating in the L*a*b* color space was 5.1.

$$\Delta E = ((\Delta L^{*2}) + (\Delta A^{*2}) + (\Delta b^{*2}))^{1/2} \qquad [\text{Math. 1}]$$

Example 7

After obtaining a pigment material in the same manner as in Example 6 except that the final concentration of the SDS was 0% (no SDS was used), the absorbance before and after heating were measured. The color value residual ratio of this sample was 67.1%.

Also, the color difference ΔE before and after heating in the L*a*b* color space was 15.1.

It can be seen that the aqueous pigment-material solution of Example 6 in which the anionic surfactant was used has more excellent dispersion stability of the phycocyanin in water, that despite no aging step, the aqueous pigment-material solution of Example 6 has a higher heat resistance level equivalent to or better than that of a conventional case of performing aging, that even after going through the heat history by heating or the like, the color value residual ratio is quite high, and that the color difference before and after the heat history is smaller, and the change in color tone is also smaller, compared to those of the aqueous pigment-material solution of Example 7 in which the anionic surfactant was not used. When the anionic surfactant is used, a remarkable result is obtained in the heat resistance, in a case where an appropriate using amount (using amount range) is selected as in Example 6.

In addition, the aqueous pigment-material solution in Example 6 is not an aqueous pigment-material solution prepared by performing dilution through the thick aqueous pigment-material solution prepared as in Example 1, and a dilute aqueous pigment-material solution from the beginning. Therefore, it was not necessary to prepare a thick aqueous pigment-material solution once and then dilute the solution before use. Furthermore, the aqueous pigment-material solution in Example 6 is the dilute aqueous pigment-material solution. In addition to this, the aqueous pigment-material solution in Example 6 improves the dispersion stability of the phycocyanin in water by adding the anionic surfactant. Therefore, it can be seen that, in the aqueous pigment-material solution in Example 6, the generation of water-insoluble component that can occur in a thick aqueous pigment-material solution is greatly suppressed, and it is not necessary to perform a centrifugal operation corresponding to the step of removing the water-insoluble component, and excellent productivity of the aqueous pigment-material solution is obtained.

Then, the content of the water-insoluble component contained in the aqueous pigment-material solution before the centrifugation was smaller in the aqueous solution of Example 7 than in the aqueous solutions of Examples 1 to 3.

INDUSTRIAL APPLICABILITY

An aqueous pigment-material solution of the present invention includes a pigment material containing 20 mmol to 200 mmol of a polycarboxylic acid (B) having one or more hydroxy groups, in terms of carboxylic acid equivalent, per 1 g of phycocyanin (A), in which in a case where both the phycocyanin (A) and the polycarboxylic acid (B) are added such that a color value represented by absorbance at 620 nm is 2.5 to 5, an optical density per 1 cm of an optical path length at 800 nm is 0.05 or lower at a hydrogen ion concentration (pH) of 3 or lower. Therefore, it is possible to provide an aqueous pigment-material solution having excellent thermal stability under an acidic condition, a method for producing the same, and a blue-colored beverage.

The invention claimed is:

1. An aqueous pigment-material solution comprising:
a pigment material containing 20 mmol to 200 mmol of a polycarboxylic acid (B) having one or more hydroxy groups, in terms of carboxylic acid equivalent, per 1 g of phycocyanin (A),
and further comprising 15 to 100 mmol of an anionic surfactant as a nonvolatile component per 1 g of the phycocyanin (A);
wherein the solution has a color value represented by absorbance at 620 nm is 2.5 to 5, an optical density per 1 cm of an optical path length at 800 nm is 0.05 or lower at a hydrogen ion; wherein the anionic surfactant is sodium dodecyl sulfate (SDS).

2. A method for producing an aqueous pigment-material solution having a hydrogen ion concentration (pH) of 3 or lower, the method comprising:
a step of dissolving phycocyanin (A) and polycarboxylic acid (B) having one or more hydroxy groups in water; and
wherein an anionic surfactant is further used in an amount of 15 to 100 mmol of an anionic surfactant as a nonvolatile component per 1 g of the phycocyanin (A); wherein the anionic surfactant is sodium dodecyl sulfate (SDS).

3. The method for producing an aqueous pigment-material solution according to claim 2,
wherein 20 mmol to 200 mmol of the polycarboxylic acid (B) having one or more hydroxy groups, in terms of carboxylic acid equivalent, is used per 1 g of the phycocyanin (A).

4. A blue-colored beverage comprising:
the aqueous pigment-material solution according to claim 1.

* * * * *